Sept. 4, 1962  C. D. GILMORE  3,052,196
SEAL BEARING RINGS FOR DOUGHNUT CUTTERS
Filed Sept. 22, 1961

INVENTOR
CHACE D. GILMORE
BY *Richard J. Rawling*
ATTORNEY

United States Patent Office 3,052,196
Patented Sept. 4, 1962

3,052,196
SEAL BEARING RINGS FOR
DOUGHNUT CUTTERS
Chace D. Gilmore, 219 S. Mechanics St.,
West Chester, Pa.
Filed Sept. 22, 1961, Ser. No. 140,047
2 Claims. (Cl. 107—14)

The present invention relates generally to doughnut formers of the reciprocating type, and it has particular relation to seal bearing rings for such formers, which are adapted to be mounted concentrically on the outside of the cutter die.

This application is a continuation-in-part of my copending application Serial Number 733,802, filed May 5, 1958, and now abandoned.

Heretofore, metal doughout formers have been made with raised integral shoulders on the outside of the die tube to serve as guides for the travel of the cutter sleeve thereover. Metal piston rings or seal rings having flat surfaces that bear directly against the inner metal surface of the cutter sleeve have also been used. These constructions had many disadvantages: The moving parts, involving metal-to-metal surfaces, became worn quickly, and, if not replaced when worn, did not cut the dough forms accurately. To replace the worn parts, the entire cutter had to be sent back to the machine shop for renovation, which put it out of operation for a substantial length of time. The cost of renovating the cutter became quite expensive since it required expensive tools and skilled workmen to do the job.

With the present invention, all of the foregoing disadvantages have been eliminated, and there is provided a flexible and resilient seal bearing ring or rings that eliminates metal-to-metal wear, considerably lengthening the life of the cutter sleeve, permit replacement easily and quickly on the job without requiring the use of any tools or the services of skilled workmen, and provides a relatively inexpensive replacement of the worn out rings.

An object of the present invention is to provide a series of replaceable flexible and resilient seal bearing rings that are inexpensive, durable and efficient.

Another object of the invention is the provision of seal bearing rings that are provided with spaced annular flexible ribs or ridges that serve to reduce the frictional contact of the sliding parts while conforming to the contour of the inner surface of the cutter sleeve.

A further object of the invention is to provide replaceable seal bearing rings having spaced annular flexible ribs or ridges extending in opposite directions, whereby the annular grooves between adjacent ribs serve as a means for entrapping a lubricant therebetween for lubricating the inner surface of the cutter sleeve while the same is passing thereover.

Another object of the invention is the provision of a flexible and resilient seal bearing ring that contracts by means of its own inferent elasticity or resiliency to provide a tight and snug fit against the three walls defining its recess for securing the same thereon, thereby eliminating any need for fastening means.

A further object of the invention is the provision of flexible and resilient seal bearing rings that are removable and replaceable on the die tube without necessitating the use of tools or requiring the services of a skilled mechanic.

Other and further objects and advantages of the invention, which result in simplicity, economy and efficiency, will be apparent from the following detailed description, reference being had to the accompanying drawings, forming a part hereof, wherein like numerals indicate like parts, in which.

Figure 1:
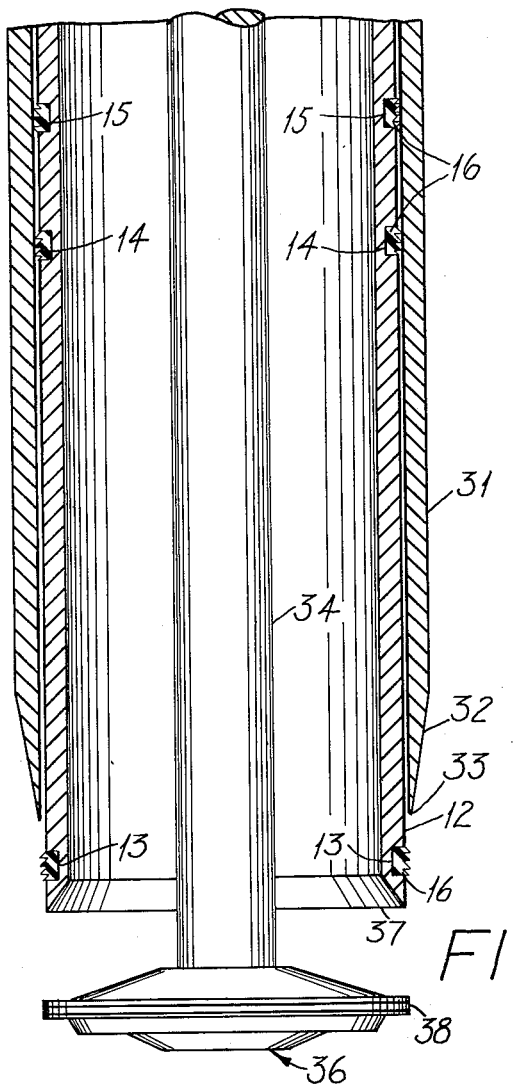
FIGURE 1 is a fragmentary vertical sectional view of a conventional reciprocating doughnut former assembly, showing the die tube or nozzle having a series of spaced recesses in which are mounted seal bearing rings embodying the invention.

Referring now to the drawings, and particularly to FIGURE 1 thereof, there is shown a conventional reciprocating doughnut former consisting of a hollow circular die tube or nozzle 12, through which a mass of raw dough is passed under pressure in a well known manner.

The outer surface area of the die tube or nozzle 12 is recessed at one or more points, as indicated at 13, 14 and 15, to provide a series of suitably spaced annular three wall recesses or grooves within which a seal bearing ring 16 made in accordance with the invention may be mounted.

Figure 2:
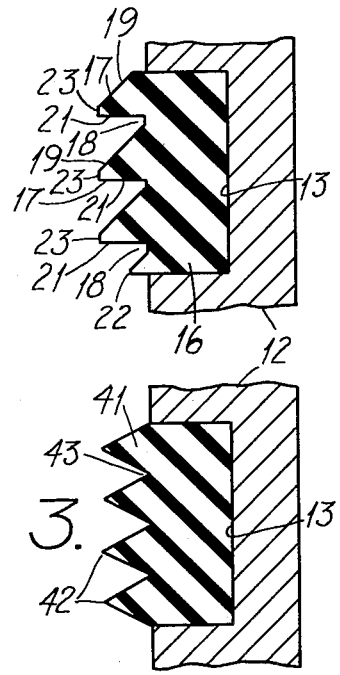
FIGURE 2 is a fragmentary and greatly enlarged cross-sectional view of one of the seal bearing rings 16, showing its recess and the details of construction of its annular ribs.

Each seal bearing ring 16 is made of a suitable tough elastic or resilient material, as for example an oil resistant synthetic rubber such as neoprene or butadiene. Each ring 16, as best shown in FIGURE 2, is provided on its annular outer surface with a series of alternately spaced ribs 17 and grooves 18. It will be noted that the ribs 17 are each provided with a tapered side edge 19 and a straight or radially extending inner side edge 21. At one end there is provided a relatively short rib 22. Each rib 17 projects beyond the surface of the die tube 12 a distance substantially equal to the depth of its adjacent grooves 18, whereby there are provided a series of flexible fingers or members for slidably engaging said inner surface of a cutter sleeve.

The seal bearing rings 16 are formed having a diameter slightly less than the diameter of the die tube 12 for which it is intended at the point of its recesses 13, 14 and 15, whereby, when the same is mounted therein, it will have a natural tendency to contract due to its own inherent elasticity or resiliency, thereby forming a snug fit against the three walls defining each of said recesses. Each rib 17 has been truncated, as indicated at 23, to provide a flat surface parallel to the longitudinal axis of the cutter sleeve to be reciprocated thereover.

A tubular cutter sleeve 31, which is shorter than the die tube 12 and is of a diameter adapted to fit slidably thereover, is mounted concentrically over said die tube 12, as best shown in FIGURE 1. The cutter sleeve 31 has its lower edge tapered, as indicated at 32, to provide a knife edge 33 for cutting the raw dough.

A fixed cutter stem 34 is mounted axially within the die tube 12 in any suitable manner (not shown) and projects below the bottom thereof. The lower end of the cutter stem 34 is threaded, and a transversely extending circular cutter disk 36 is secured thereto by means of a nut or screw (not shown). The cutter disk 36 has a circular cutting edge 38 of a diameter adapted to fit snugly but slidingly within the cutter sleeve 31.

Obviously, the invention provides a plurality of spaced bands of soft, pliable and flexible material for contacting the metal surface of the reciprocating cutter sleeve 31, and to provide a necessary seal between it and its die tube 12. The rings 16 are easily removable, and can be taken off and replaced by the fingers without necessitating the use of tools or the services of a skilled mechanic. It will be obvious that the cost of new seal bearing rings 16 to replace worn rings is but a very small fraction of the cost of a new die assembly or of reconditioning a worn assembly. It will be readily apparent that all of the wear between the two moving parts of the reciprocating doughnut former, namely, the die tube 12 and the cutter sleeve 31, will be placed on these flexible seal bearing rings 16 and not on the metal surfaces of the moving parts.

It will be noted that, while each of the seal bearing rings 16 is of an identical construction, they are mounted differently in their respective recesses 13, 14 and 15 on the die tube 12. The ring 16 in the recess 13 is mounted with its angular sides 19 of its ribs 17 projecting upwardly at an angle with respect of the transverse axis of the die tube 12. The ring 16 in the recess 15 is mounted oppositely, i.e., its angular sides 19 of its ribs 17 projecting downwardly. The ring 16 in the recess 14 is likewise mounted with its angular sides 19 of its ribs 17 extending downwardly. In this arrangement, the two outside seal bearing rings 16 are mounted with their ribs 17 projecting outwardly and away from each other while the ribs 17 of the intermediate seal bearing ring is mounted oppositely to the ribs of its closest seal bearing ring.

In using the formers of this invention, it is advisable before attaching the assembly to the dough housing (not shown) to remove the cutter sleeve 31 from its die tube 12, and momentarily immerse both parts in the hot cooking liquid used for deep-frying the raw dough forms to be cut thereby. In this manner, the entire outer surfaces of the seal bearing rings 16 will receive and hold a quantity of lubricant in their grooves 18 between their annular ribs 17. Upon assembly, such lubricant will be entrapped within said grooves 18, providing a continuing lubricant supply within said seal bearing rings 16 for the inner surface of the cutter sleeve 31.

Figure 3:
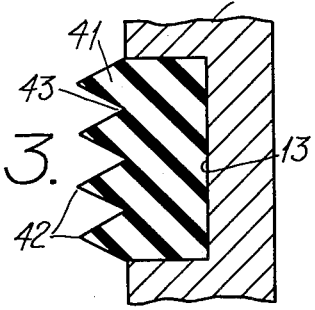
FIGURE 3 is a view similar to FIGURE 2 of a modified form of seal bearing ring constructed in accordance with the principles of the invention.

Referring now to FIGURE 3, there is shown a modified form of seal bearing ring 41, which has a plurality of alternately spaced annular V-shaped ribs 42 and V-shaped grooves 43. The ribs 42 project radially outwardly beyond the outer surface of the die tube 12 on which it is to be mounted a distance substantially equal to the depth of its grooves 43, whereby there are provided a series of V-shaped flexible fingers or ridges for slidably engaging said inner surface of the cutter sleeve 31.

In operation of the cutter assembly, as the dough (not shown) is extruded in annular form through the hollow die tube 12 and around the cutter disk 36, it is passed between the lower edge 37 of the die tube 12 and the top of said cutter disk 36. When the cutter sleeve 31 is moved downwardly, its lower knife edge 33, when it contacts the annular edge 38 of the cutter disk 36, shears off an annular form of dough. When such shearing stroke has been completed, the cutter sleeve 31 is withdrawn upwardly and over the die tube or nozzle 12 for the beginning of another stroke cycle.

It will be apparent from the operation above described that the inner surface of the cutter sleeve 31 rides over the die tube or nozzle 12 entirely on the outer surfaces or ridges 23 of the spaced ribs 16 of the spaced seal bearing rings 13, 14 and 15, and that at no time does its inner metal surface come into contact with the outer metal surface of the die tube 12. The small surface area of the truncated ridges 23 on the ends of the ribs 17 of the seal bearing rings 16 offer little or no frictional resistance or drag to the sliding inner surface of the cutter sleeve 31.

At the same time the flexible ribs 17 offer a desirable wiping action against the inner contacting surface of the cutter sleeve 33, keeping the same clean from dirt, dust and dough particles. The lubricant that was entrapped within the grooves 18 upon assembly provides an additional lubricant for said bearing surfaces during the period of its operation.

Although I have only described in detail and illustrated in the drawings but two forms which the invention may assume, it will be readily apparent to those skilled in the art that the same need not be so limited, but that various modifications may be made therein without departing from the spirit thereof or from the scope of the appended claims.

What I claim is:

1. In a doughnut cutter assembly, a fixed die tube through which dough is to be passed under pressure, said die tube having a fixed cutter disk mounted axially thereof and projecting therebelow, and a reciprocating cutter sleeve slidable longitudinally of said die tube and over said cutter disk, said die tube having a series of longitudinally spaced annular recesses in its outer surface for receiving seal bearing rings, and a removable flexible seal bearing ring mounted in each recess under its own contraction having a series of spaced ribs projecting beyond the surface of said die tube and contacting directly the inner surfaces of said cutter sleeve, said ribs projecting radially beyond the surface of said die tube and having an angular pitch for contacting directly the inner surfaces of said cutter sleeve, the angular pitch of said ribs on at least one of said seal bearing rings extending oppositely with respect of the angular pitch of at least one of the other of said seal bearing rings.

2. In a doughnut cutter assembly, a fixed die tube through which dough is to be passed under pressure, said die tube having a fixed cutter disk mounted axially thereof and projecting therebelow, and a reciprocating cutter sleeve slidable longitudinally of said die tube and over said cutter disk, said die tube having a series of longitudinally spaced annular recesses in its outer surface for receiving seal bearing rings, and a removable flexible seal bearing ring mounted in each recess under its own contraction having a series of spaced truncated ribs projecting beyond the surface of said die tube and contacting directly the inner surfaces of said cutter sleeve, said ribs projecting radially beyond the surface of said die tube having an angular pitch for contacting directly the inner surfaces of said cutter sleeve, the angular pitch of said ribs on at least one of said seal bearing rings extending oppositely with respect of the angular pitch of at least one of the other seal bearing rings.

References Cited in the file of this patent

UNITED STATES PATENTS

| | | |
|---|---|---|
| 2,018,205 | Evans | Oct. 22, 1935 |
| 2,117,399 | Carpenter | May 17, 1938 |
| 2,208,620 | Baisch | July 23, 1940 |
| 2,771,142 | Sloan et al. | Nov. 20, 1956 |
| 2,811,397 | Cline | Oct. 29, 1957 |